J. P. LAVOIE.
AUTOMOBILE REAR AXLE AND AXLE CASING.
APPLICATION FILED APR. 21, 1921.
1,437,186.
Patented Nov. 28, 1922.
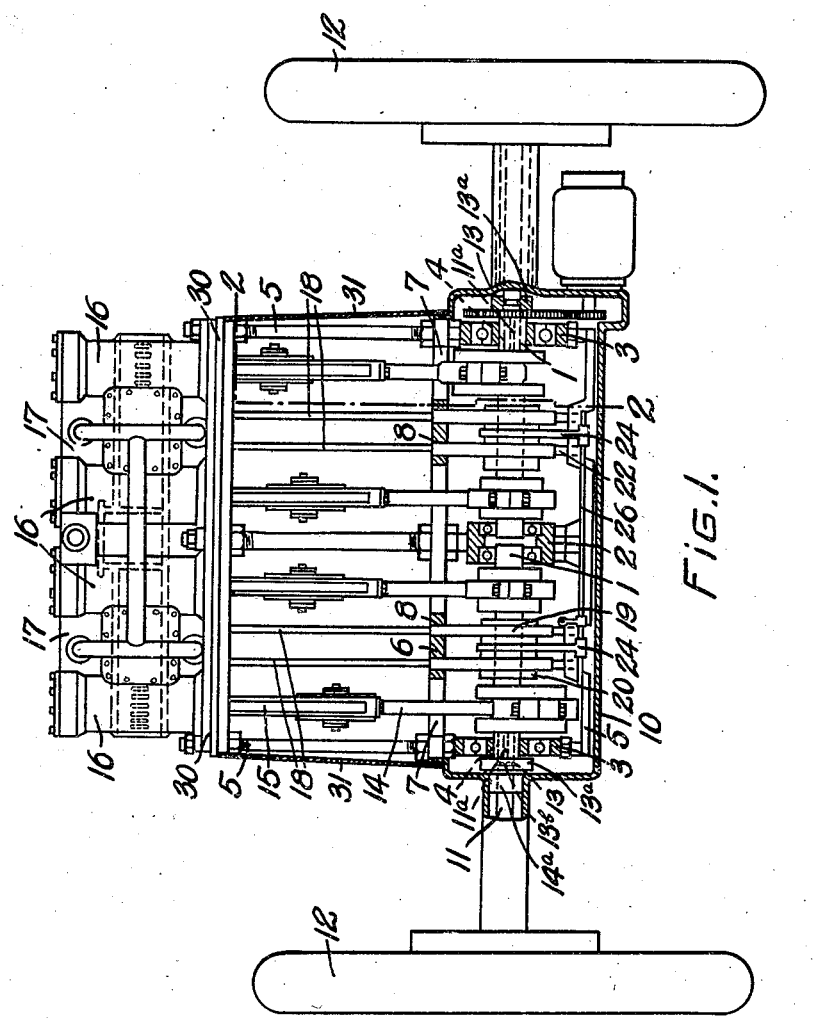
Inventor
J. P. Lavoie
By
Attorney

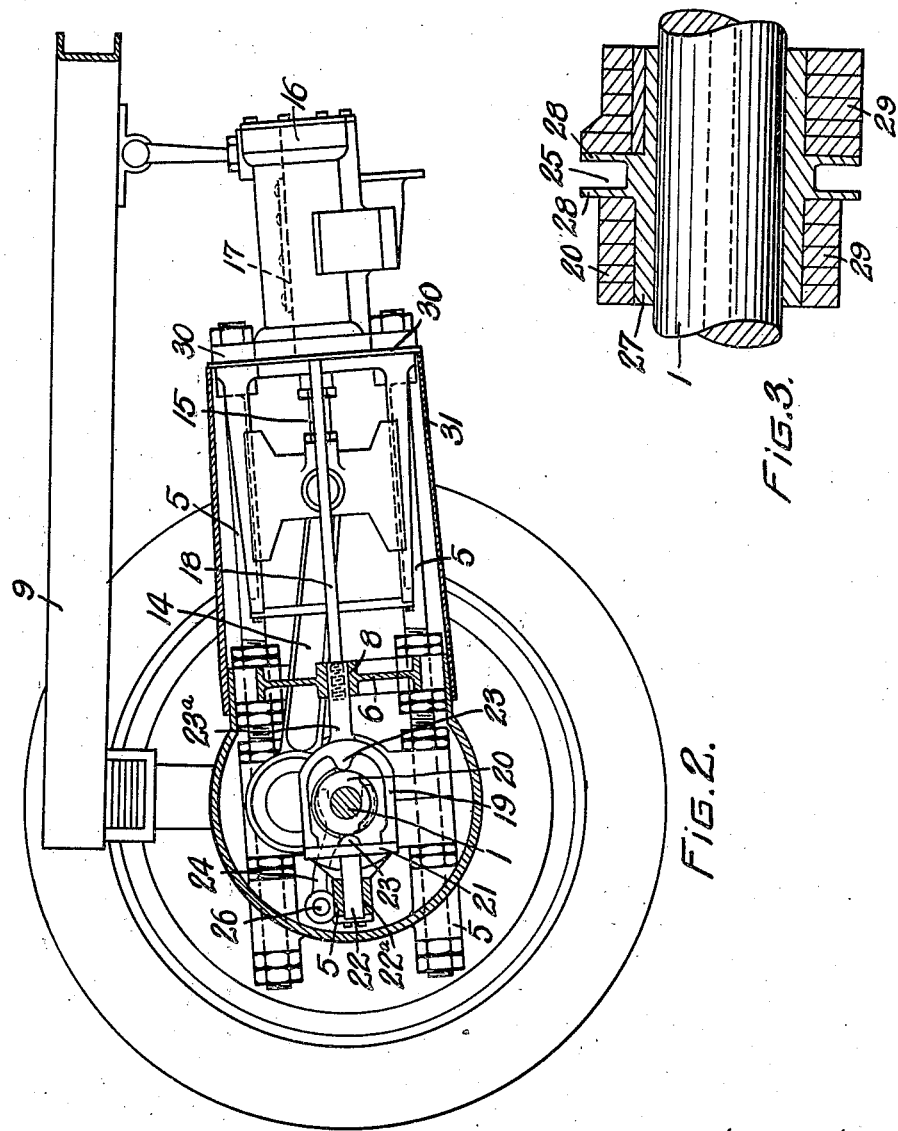

Patented Nov. 28, 1922.

1,437,186

UNITED STATES PATENT OFFICE.

JOSEPH PIERRE LAVOIE, OF MONTREAL, QUEBEC, CANADA.

AUTOMOBILE REAR AXLE AND AXLE CASING.

Application filed April 21, 1921. Serial No. 463,172.

*To all whom it may concern:*

Be it known that I, JOSEPH PIERRE LAVOIE, a British subject, residing at 2689 Notre Dame East, in the city of Montreal, in the Province of Quebec, in the Dominion of Canada, have invented certain new and useful Improvements in Automobile Rear Axles and Axle Casings; and I do hereby declare that the following is a full, clear, and exact description of the invention.

The present invention relates to improvements in rear axles for automobiles, and in casings therefor, and its main object is to provide an efficient, simple and cheap driving mechanism to serve the purpose.

The invention will be better understood with the aid of the following description and accompanying drawings.

In the drawings:

Figure 1 is a view, partly in plan and partly in horizontal section, showing the invention applied to an automobile.

Figure 2 is a sectional view on line 2—2 in Figure 1.

Figure 3 is a transverse section through the cams.

Like numerals of reference indicate corresponding parts in each figure.

Referring to the drawings, 1 are the two sections of the crank shaft, each of which is suitably journalled in the central bearing 2, and side bearings 3. The outer ends of said crank shaft sections slightly project beyond said bearings 3 and are provided with the sockets or holes 4. The bearings 2 and 3 are supported in the rectangular frame 5.

Across said frame 5 is rigidly secured a transverse bar 6 provided with openings 7 for the connecting rods 14 to project therethrough and openings 8 for the valve rods 18 to operate therethrough. The said frame 5 is secured to the chassis 9 of an automobile by any convenient means, and 10 is a casing or housing consisting of a one-piece partly circular casting adapted to enclose said crank shaft sections and frame and having side extensions to enclose the section 11 of the axle.

At opposite ends of the crank shaft, and adapted to engage said sockets 4, are mounted the axle sections 11 which are locked therein by the keys 11$^a$. The said axle sections project through the housing 10, and 12 are the rear wheels mounted thereon in any convenient manner. The axle sections are grooved at 13 adjacent the ends of the crank shaft sections, and 13$^a$ are collars fitted on the axle sections, each collar being provided with an inner circumferential flange 13$^b$ adapted to engage the groove 13 in the corresponding axle section; 14$^a$ are bushings engaging the housing 10 and in which the axle sections are supported.

The offset portions of the crank shaft 1 are set in opposite relation in respect to each other, or in other words at 180°, and each is turned by its respective connecting rod 14 which projects through the corresponding opening 7 in the cross bar 6 and is operatively connected to the piston rod 15.

The piston rods are suitably secured to the pistons which operate in the cylinders 16. In the steam chests 17 of the engine operate the valves which are actuated by valve rods 18 which project through the openings 8 in the cross bar 6. Each valve rod 18 is provided at its end with a horizontal yoke member 19, each yoke member respectively saddling one of the cams 20 mounted on the crank shaft sections 1. The open end of the yoke member is closed by a vertical bar 21, and 22 is a guide pin preferably forming part of said bar 21 and which slides in a hole 22$^a$ in the rear side of the frame 5. On each yoke 19 and its bar 21 are provided two contact lugs 23 which are adapted to engage the cams 20. Opposite each guide pin 22, there is provided an arm 23$^a$ which extends through the corresponding hole or opening 8 in the cross bar 6, and in the end of which is secured the valve rod 18. Thus the yoke member will be properly guided and the valve rod always centered.

The cams on the two sections of the crank shaft are moved horizontally thereon by means of forked shifting arms 24, each of said shifting arms engaging a central annular groove 25 provided intermediate of a sleeve 27 which supports said cams. The forked arms are rigidly mounted on a sliding rod 26, by means of which they are shifted. Any suitable means can be used to move said rod 26 horizontally.

The cams, as illustrated, are preferably arranged in pairs, each pair mounted on one of the sleeves 27 at opposite sides of a central annular flange 28 which is recessed to form the previously mentioned groove 25. The sleeve 27 is suitably keyed to the crank shaft, and 29 are the individual sections or members of the cams which are mounted on or integrally formed with said sleeve.

The cylinders 16 are provided with an integral flange 30 to which is secured the frame 5, and 31 is a cover or housing adapted to fit snugly against said flange at one end and over the housing 10 at the other end, thus completely enclosing the connecting rods, piston rods, cross heads, and valve rods.

What I claim as my invention is:

1. A rear axle drive for automobiles, comprising a frame; independent crank shaft sections journalled in said frame; a housing enclosing the crank shaft sections; an engine rigidly secured to said frame and housing and connected to drive said sections; axle sections operatively connected to said crank shaft sections and forming detachable axial extensions thereof; and wheels mounted on said axle sections.

2. A rear axle drive for automobiles, comprising a frame; independent crank shaft sections journalled in said frame; a housing enclosing the crank shaft sections; an engine rigidly secured to said frame and housing and embodying a plurality of cylinders provided with a common flange for connection to said housing; axle sections operatively connected to said crank shaft sections and forming detachable axial extensions thereof; and wheels mounted on said axle sections.

3. A rear axle drive for automobiles, comprising a frame; crank shaft sections journalled in said frame; a housing; an engine supported by said frame and housing and embodying a plurality of cylinders; pistons and connecting rods for driving the crank shaft sections; cams carried by said crank shaft sections and shiftable longitudinally thereon; means for shifting said cams; valves associated with the engine cylinders; valve rods actuated by said cams; axle sections connected to said crank shaft sections; and wheels mounted on said axle sections.

4. A rear axle drive for automobiles, comprising a frame; crank shaft sections journalled in said frame; a housing; an engine supported by said frame and housing; pistons and connecting rods for driving the crank shaft sections; cams carried by said crank shaft sections and shiftable longitudinally thereon; shifting arms operatively engaging said cams; means for operating said shifting arms; valves associated with the engine cylinders; valve rods provided with yoke members embracing said cams for actuation thereby; axle sections connected to the crank shaft sections; and wheels mounted on said axle sections.

5. A rear axle drive for automobiles, comprising a multi-cylinder engine; valves associated with the engine cylinders and having valve rods connected to them; a pair of independent crank shaft sections connected to be driven from the engine; a shiftable sleeve on each crank shaft section having a central circumferential groove; a pair of cams on each sleeve at opposite sides of the groove therein for actuating the valve rods; a sleeve-shifting device having members engaged in the grooves of both sleeves; axle sections connected to the crank shaft sections; and wheels on the axle sections.

Signed at Montreal, Quebec, Canada, this 8th day of April, 1921.

JOSEPH PIERRE LAVOIE.

Witnesses:
C. PATENAUDE,
G. BEAUDOIN.